United States Patent [19]

Ibe et al.

[11] Patent Number: 5,201,248

[45] Date of Patent: Apr. 13, 1993

[54] MATERIALS FOR BALANCING ROTATORS AND METHOD FOR BALANCING ROTATORS

[75] Inventors: Hiromitu Ibe, Kosai; Takazou Fujimoto, Fujieda, both of Japan

[73] Assignees: Sumitomo Bakelite Company Limited; Asmo Co., Ltd., both of Tokyo, Japan

[21] Appl. No.: 800,732

[22] Filed: Dec. 3, 1991

Related U.S. Application Data

[62] Division of Ser. No. 584,001, Sep. 18, 1990, abandoned.

[30] Foreign Application Priority Data

Sep. 19, 1989 [JP] Japan ................................. 1-240626

[51] Int. Cl.$^5$ .................... F16F 15/22; C03J 4/00; B60B 1/00; C08G 59/40
[52] U.S. Cl. .................... 74/573 R; 528/103; 528/110; 528/111; 74/572; 156/330
[58] Field of Search ............. 523/428, 429, 440, 443, 523/442; 528/93, 103, 113, 114, 533; 74/572, 573 R, 574; 301/5 B, 5 B, 5 A; 156/330

[56] References Cited

U.S. PATENT DOCUMENTS

| 3,939,020 | 2/1976 | Caramanian | 74/573 R X |
| 3,968,769 | 7/1976 | Gusarov et al. | 74/573 R X |
| 3,996,883 | 12/1976 | Gusarov et al. | 74/573 R |
| 4,083,735 | 4/1978 | Caramanian | 156/330 X |
| 4,546,155 | 10/1985 | Hirose et al. | 528/103 |
| 4,647,605 | 3/1987 | Ando et al. | 528/110 |
| 4,652,597 | 3/1987 | Itabashi et al. | 528/104 |
| 4,689,388 | 8/1987 | Hirai et al. | 528/111 |
| 4,887,989 | 12/1989 | Kerecman | 74/573 R |
| 4,895,551 | 1/1990 | Fritz | 74/573 R X |
| 4,998,448 | 3/1991 | Ellis | 74/573 R |
| 5,129,284 | 7/1992 | Brueckner et al. | 74/572 X |

FOREIGN PATENT DOCUMENTS

| 59-110942 | 6/1984 | Japan | 74/573 R |
| 60-72917 | 4/1985 | Japan . | |
| 60-216751 | 10/1985 | Japan | 74/573 R |
| 112620 | 5/1987 | Japan . | |
| 203535 | 9/1987 | Japan . | |
| 63311 | 1/1988 | Japan . | |
| 63-92639 | 4/1988 | Japan . | |
| 3-265738 | 11/1991 | Japan | 74/573 R |
| 2119063 | 11/1983 | United Kingdom | 74/573 R |

*Primary Examiner*—Vinh T. Luong
*Attorney, Agent, or Firm*—Browdy and Neimark

[57] ABSTRACT

A one-pack type liquid epoxy resin composition for balancing rotators comprises an epoxy resin, a curing agent, a curing accelerator, an inorganic filler, and a thixotropic agent as main components, wherein said curing agent is dicyandiamide or a dibasic acid dihydrazide and said curing accelerator is a tertiary amino group-containing compound obtained by reacting a polyfunctional epoxy compound, a compound having a tertiary amino group and at least one active hydrogen in the molecule, and a carboxylic acid anhydride. Further, a method for balancing a rotator comprises correcting unbalance of the rotator caused at rotation by applying a balancing material consisting of the above epoxy resin composition to the rotator by an automatic unbalance-correcting apparatus.

8 Claims, 1 Drawing Sheet

AUTOMATIC UNBALANCE-CORRECTING APPARATUS

MATERIALS FOR BALANCING ROTATORS AND METHOD FOR BALANCING ROTATORS

This application is a divisional of application Ser. No. 07/584,011 filed Sep. 18, 1990 now abandoned.

FIELD OF THE INVENTION

The present invention relates to a one-pack type liquid epoxy resin composition used for correcting unbalance of a rotator at rotating, that is, for balancing a rotator and a method for balancing a rotator using this composition.

RELATED ART STATEMENT

Rotators such as rotors for rotary electric machines, and so they generate vibration at the time of rotating if balance is not completely kept. Hitherto, in many cases, outer side of a rotator has been cut for balancing it. However, this method causes generation of noise at rotating, and hence a method of balancing by embedding screws or applying putty or lead has also been employed. The conventionally used putty resins are very high in viscosity, and therefore correction of unbalance has been carried out by hand method.

Under the circumstances, materials for balancing rotators applicable to automatic unbalance-correcting machines which make possible automating of correction of unbalance have been strongly demanded for improvement of productivity.

As such balancing materials, the inventors have already obtained those which satisfy characteristics as balancing materials to some extent, by using a blend which comprises an epoxy resin, dicyandiamide or a dibasic acid dihydrazide as a curing agent, an imidazole compound as a curing accelerator, an inorganic filler and a thixotropic agent, but these have defects such as deterioration by heating, large amount of filler to be added and hence somewhat low strength under heat. Besides, they show somewhat large increase in viscosity and are not sufficient in applicability to an automatic unbalance-correcting apparatus.

On the other hand, when only a curing accelerator comprising a tertiary amino group-containing compound obtained by reacting a polyfunctional epoxy compound, a compound having tertiary amino group and at least one active hydrogen in the molecule and a carboxylic anhydride is blended with an epoxy resin without using a curing agent, the resulting composition is lower in strength under heating and cannot be used as a balancing material.

OBJECT AND SUMMARY OF THE INVENTION

The present invention relates to a method of balancing by applying a liquid resin to rotators such as rotors of rotary electric machines and curing the applied resin and to a one-pack type liquid epoxy resin composition used therefor, and provides a resin composition by which automatic balancing becomes possible using an automatic unbalance-correcting apparatus.

The inventors have conducted research in an attempt to obtain resin compositions which have rapid curability and low viscosity, show no sagging and are excellent in storage stability, in place of the conventional balancing resins which have high viscosity, are in the form of putty and cannot be discharged by an automatic apparatus. As a result, they have studied a curing agent, a thixotropic agent and the like in a system comprising an epoxy resin, a curing agent, a curing accelerator, a thixotropic agent and an inorganic filler, and have provided a one-pack type liquid epoxy resin composition which has high storage stability, has a pot life of more than 2 months at room temperature, is low in viscosity, high in thixotropic properties and rapid in curing and thus shows no sagging at curing and can be discharged by an automatic apparatus.

That is, the present invention is a one-pack type liquid epoxy resin composition for balancing rotators which comprises an epoxy resin, a curing agent, a curing accelerator, an inorganic filler and a thixotropic agent, characterized in that the curing agent is dicyandiamide or a dibasic acid dihydrazide and the curing accelerator is a tertiary amino group-containing compound obtained by reacting a polyfunctional epoxy compound, a compound having tertiary amino group and at least one active hydrogen in the molecule and a carboxylic acid anhydride.

The present invention further provides a method for balancing rotators which comprises applying a balancing material comprising the above epoxy resin composition to a rotator by an automatic unbalance-correcting apparatus to correct unbalance of the rotator at the time of rotation.

DETAILED DESCRIPTION OF THE INVENTION

Figure 1:
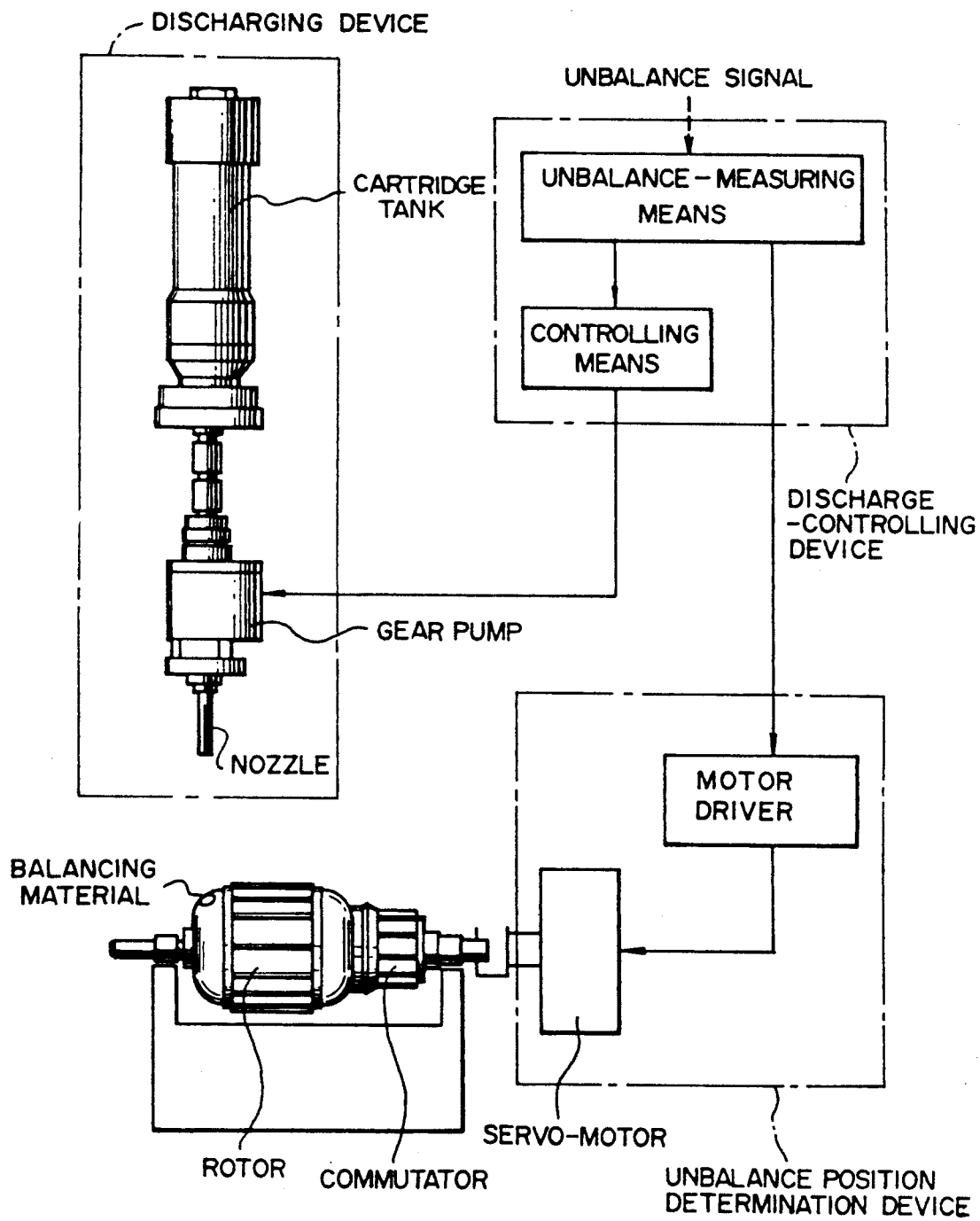
FIG. 1 is a schematic view of one example of automatic unbalance-correcting apparatus used for the balancing method of the present invention.

It is an essential requirement that the epoxy resin used in the present invention be liquid at room temperature, and the epoxy resin includes, for example, bisphenol A type epoxy resin. However, for obtaining the liquid resin composition of a viscosity making automation possible intended by the present invention, epoxy resins of low viscosity which do not cause deterioration of properties such as heat resistance and impact resistance, for example, bisphenol F type epoxy resin and bisphenol AD type epoxy resin are preferred than bisphenol A type epoxy resin. Preferably, such epoxy resins are used in an amount of at least 50% by weight in total epoxy resin.

Curing agents have potentiality, and if difference in weight before and after curing is large, balancing is difficult, and so it is preferred that curing weight reduction rate at high temperature (120°–200° C.) is small.

The curing agents include, for example, boron trifluoride-amine adduct, dicyandiamide, dibasic acid dihydrazide, acid anhydride, amine.imide compound, and triazine compound.

Among them, those which are low in weight reduction rate at curing, can cure within 30 minutes under the condition of 120°–200° C. and are superior in storage stability at room temperature, are limited to dicyandiamide and dibasic acid dihydrazides.

Addition amount of dicyandiamide is preferably 1–10 parts per 100 parts of epoxy resin. In this specification, part means part by weight. When the addition amount is less than 1 part, curing is slow and curing is difficult, and when it is more than 10 parts, cured product becomes brittle. Furthermore, practically, the amount of 4–9 parts is especially preferred.

The dibasic acid dihydrazide is represented by the structural formula:

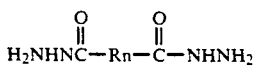

wherein Rn is, for example, as shown in the following Table.

| Dibasic acid dihydrazide | Rn |
| --- | --- |
| Oxalic acid dihydrazide | — |
| Malonic acid dihydrazide | —CH$_2$— |
| Succinic acid dihydrazide | —(CH$_2$)$_2$— |
| Adipic acid dihydrazide | —(CH$_2$)$_4$— |
| Sebacic acid dihydrazide | —(CH$_2$)$_8$— |
| Diglycollic acid dihydrazide | —CH$_2$—O—CH$_2$— |
| Tartaric acid dihydrazide | —CH(OH).CH(OH)— |
| Malic acid dihydrazide | —CH$_2$.CH(OH)— |
| Isophthalic acid dihydrazide | 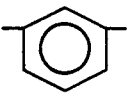 |

Among these compounds, adipic acid dihydrazide is preferred in consideration of feeding stability and curing properties.

Addition amount of dibasic acid dihydrazide is preferably 1–40 parts per 100 parts of epoxy resin. If the addition amount is less than 1 part, curing is difficult, and if it is more than 40 parts, cured product becomes brittle. Practically, the amount of 15–30 parts is especially preferred.

Inorganic fillers may be those which can be filled in the composition at a high filling rate and which can provide a specific gravity of the composition of 1.6 or more (at 25° C.) and a viscosity of the composition at which the composition can be discharged by an automatic machine (10,000 poises or more at 30° C.). Considering the relation between the high specific gravity of inorganic fillers and the oil absorption property thereof, there can be cited, for example, silica fillers, barium sulfate fillers, alumina fillers, and aluminum hydroxide fillers. Especially preferred are silica fillers and alumina fillers.

Average particle size of an inorganic filler is preferably 10–20 μm. If it is smaller than 10 μm, viscosity of the composition is too high, and if it is larger than 20 μm, in some cases coil of a rotator is damaged by the particles.

Amount of such an inorganic filler to be added is preferably 150–300 parts per 100 parts of an epoxy resin. If it is less than 150 parts, specific gravity of the mixture is not great and amounts of organic components such as resin and curing agent relatively increase, resulting in increase of loss of weight on heating for curing. If it is more than 300 parts, viscosity of the composition is too high and discharging by an automatic machine tends to become difficult.

Specific gravity of the epoxy resin composition of the present invention at 25° C., which has relation with amount of an inorganic filler, is preferably 1.6–2.4. If the specific gravity is less than 1.6, amount of the composition to be applied to a rotator increases due to the small specific gravity, and if it is more than 2.4, amount of the inorganic filler increases and adhesion strength decreases. Practically, 1.8–2.1 is preferred.

Curing accelerators are preferably those which give low weight reduction rate of the composition on curing and improve heat resistance of the composition and besides, are excellent in storage stability and high in heat-reactivity. As examples thereof, there are generally alkyl urea compounds, imidazole compounds, and DBU (1,8-diazo-bicyclo(5,4,0)undecene-7) compounds. However, as mentioned before, tertiary amino group-containing compounds obtained by reacting (a) polyfunctional epoxy compounds, (b) compounds having tertiary amino group and at least one active hydrogen in the molecule and (c) carboxylic acid anhydrides are selected in the present invention.

This curing accelerator will be explained below.

(a) Polyfunctional epoxy compounds.

As the component (b), preferred are compounds which have, in the molecule, a tertiary amino group and at least one active hydrogen-containing functional group selected from hydroxyl group, primary amino group, secondary amino group and mercapto group.

As examples of the compounds of component (b), there are cited 1-phenoxymethyl-2-dimethylamino ethanol, I N-methylpiperazine, imidazole, 2-ethyl-4-methylimidazole, 2-phenyl-4-methylimidazole, 2-mercaptobenzothiazole, 1-(2-hydroxy-3-phenoxypropyl)-2-methylimidazole, and 2-(dimethylaminoethyl)phenol.

As examples of carboxylic acid anhydrides of component (c), there are cited succinic anhydride, phthalic anhydride, tetrahydrophthalic anhydride, methyltetrahydrophthalic anhydride, hexahydrophthalic anhydride, methylhexahydrophthalic anhydride, methylnadic anhydride, dodecenylsuccinic anhydride, pyromellitic anhydride and 5-(2,5-dioxotetrahydrofuryl)-3-methyl-3-cyclohexene-1,2-dicarboxylic anhydride.

Reaction ratio of (a), (b) and (c) in preparation of adducts as curing accelerators is 0.4–2 in active hydrogen equivalent of the compound of component (b) which has both tertiary amino group and active hydrogen-containing functional group such as hydroxyl group, primary amino group, secondary amino group or mercapto group in the molecule and 0.25–2.5 in equivalent of component (c) per one epoxy equivalent of the polyfunctional epoxy compound of component (a). Preferably, equivalent of component (b) is 0.5–1.5 and that of component (c) is 0.7–2.0.

As far as these relations of equivalent are satisfied, components (a), (b) and (c) may be used as mixtures of two or more of compounds, respectively.

These curing accelerators can be easily obtained by sufficiently mixing the components (a), (b) and (c), carrying out addition reaction of them at room temperature or under heating, then completing the grinding the reaction product, or carrying out the addition reaction using a solvent such as tetrahydrofuran, dioxane and methyl ethyl ketone, removing the solvent and grinding the resulting solid product.

The compounds obtained by the methods mentioned above are used as a curing accelerator.

The above curing accelerator is superior in heat resistance to other curing accelerators such as imidazole compounds and DBU, and is added in a large amount to an epoxy resin and hence it is easy to uniformly incorporate in the composition. Furthermore, the resulting composition is superior in pot life and shows substantially no increase in viscosity during use and so is excellent in accuracy of automatic discharging.

Addition amount of this curing accelerator is preferably 3–30 parts per 100 parts of epoxy resin. If it is less than 3 parts by weight, the resin composition cannot be sufficiently cured and adhesion to coil of a rotator deteriorates. If it is more than 30 parts, pot life of the resin composition decreases. Practically especially preferred range is 10-25 parts.

The curing accelerator per se used in the present invention can be used as a curing agent for an epoxy resin like other curing accelerators. However, when it is used as a curing agent, curing proceeds slowly and the resulting epoxy resin cured product is low in crosslinking density and so is insufficient in adhesion and heat resistance and is poor in adhesion to coil. Thus, when a rotator rotates at high temperature, distortion, cracking and falling off of the cured balancing material occur and actual use of the composition is difficult.

When dicyandiamide or a dibasic acid dihydrazide is used as a curing agent together with the curing accelerator used in the present invention, curing proceeds rapidly, and a cured product having sufficient crosslinking density can be obtained, in addition to maintaining a pot life of practical period at room temperature.

Especially, as stated hereinbefore, practically very desired curability and characteristics of the cured product can be obtained by using 4-9 parts of dicyandiamide or 15-30 parts of dibasic acid dihydrazide together with 10-25 parts of the above curing accelerator per 100 parts of epoxy resin.

A thixotropic agent is contained in the epoxy resin composition of the present invention for imparting thixotropy, and a thixotropy index of 1.4 or more at 30° C. is preferred in consideration of discharging accuracy by an automatic machine and accuracy in balance retention after application to a rotator.

A wide variety of thixotropic agents are present including organic and inorganic compounds, but those which are high in thixotropy imparting effect, small in thickening action and low in weight reduction rate at high temperature, are preferred for obtaining the composition aimed at by the present invention.

Therefore, thixotropic agents containing solvent cannot be used. As inorganic thixotropic agents, colloidal silica is most effective, but is insufficient in thixotropy at high temperature and causes great change of thixotropy with time in the resulting composition, and thus this is not suitable for the present invention.

As organic thixotropic agents, there are polyethylene oxide, polyamide, benzylidenesorbitol, organic composite of colloidal hydrous aluminum silicate, organic bentonite, etc. Polyethylene oxide and polyamide are not suitable for the use intended in the present invention because of thermal deterioration at high temperature (120°-200° C.). As the thixotropic agent suitable for the present invention, there are organic composite of colloidal hydrous aluminum silicate and organic bentonite which do not lose thixotropy at high temperature, have heat resistance and less in change of thixotropy with time. As a result of research in an attempt to obtain a composition of low viscosity, it has been confirmed that organic bentonite is most suitable. The organic bentonite here means montmorillonite having surface modified with organic compounds.

The inventors have made research on addition amount of organic bentonite and/or organic composite of colloidal hydrous aluminum silicate as a thixotropic agent. As a result, it has been found that when amount of the thixotropic agent is less than 5 parts per 100 parts of epoxy resin, sagging occurs at curing and so the amount should be at least 5 parts. When the addition amount is more than 12 parts, the composition becomes highly viscous (more than 100,000 poises at 30° C.) and operability, especially applicability to an automatic machine is inferior.

Therefore, addition amount of organic bentonite and/or organic composite of colloidal hydrous aluminum silicate is most suitably 5-12 parts per 100 parts of epoxy resin.

Viscosity of one-pack type liquid epoxy resin composition of the present invention is preferably 10,000-100,000 poises at 30° C. If the viscosity is less than 10,000 poises, it is too low and sagging may occur after application to coil and when it is more than 100,000 poises, discharging by an automatic machine is difficult.

One example of automatic unbalance-correcting apparatuses used in the balancing method of the present invention will be explained.

As shown in FIG. 1, the apparatus used in the present invention comprises a discharge-controlling device, a discharging device and an unbalance position determination device.

The discharge-controlling device comprises an unbalance-measuring means which measures position of unbalance and amount of unbalance by unbalance signals obtained by rotating a rotator such as a rotor of a rotary electric machine, and a controlling means which calculates and controls amount of balancing material to be discharged depending on the unbalance position and the amount of unbalance which have been determined by the unbalance-measuring means and have been input in the controlling means.

The unbalance position determination device comprises a driver which gives instructions to act on unbalance position of the rotator to be corrected by the signal from the unbalance-measuring means of the discharge-controlling device, and a servo-motor which performs automatic positioning of the rotator by the instructions from the driver.

The discharging device comprises a gear pump which can extrude the balancing material in a fixed amount based on the control signal from the controlling means, a nozzle which discharges the extruded balancing material to the position of the rotator to be corrected, and an exchangeable cartridge tank which feeds the balancing material to the gear pump and simultaneously stores the balancing material.

The controlling means of the discharge-controlling device is operated by a microcomputer.

The balancing material of the present invention is advantageous in the following points when used in an automatic unbalance-correcting apparatus as mentioned above.

(i) A tank of cartrige type and of small size which can easily replenish balancing material (easy in handling) is used as a tank in the discharging device, and in some cases the apparatus must be closed for a long time with the balancing material being retained in the gear pump or nozzle, thus, those which are excellent in pot life as in the balancing material of the present invention, are desired from the points of operability and maintenance.

(ii) Since an automatic unbalance-correcting apparatus automatically measures unbalance position and amount of unbalance and depending thereon, discharges a necessary amount of balancing material, a high discharging accuracy of balancing material (small variation of discharging amount when balancing material is repeatedly discharged in the same amount and in the same apparatus) is required. In this respect, the balancing material of the present invention which shows good discharging accuracy is preferred.

(iii) When after completion of a first correction by the apparatus, the rotator is again rotated in order to confirm that no unbalance remains, the balancing material of the present invention applied for the first correction hardly falls off or sags by the rotation and so is suitable for the automatic unbalance-correcting apparatus.

In the epoxy resin composition for balancing of the present invention, dicyandiamide or a dibasic acid dihydrazide as a curing agent and the specific compound mentioned above as a curing accelerator are incorporated in an epoxy resin material containing much filler. Therefore, the composition undergoes no deterioration with heat and is high in strength at high temperature and is excellent in adhesion to a rotator. Thus, there occurs no accident such as scattering of balancing material at rotating, especially under high temperature. Furthermore, the composition is superior in pot life and besides, is good in applicability to an automatic unbalance-correcting apparatus.

When organic bentonite or organic composite of colloidal hydrous aluminum silicate or a mixture thereof is used as a thixotropic agent for the one-pack type liquid epoxy resin composition, the composition is superior in operability in use for an automatic unbalance-correcting apparatus because of their small thickening action at room temperature and does not lose thixotropy at high temperature and does not sag at curing under heating.

DESCRIPTION OF PREFERRED EMBODIMENTS

The present invention will be actually explained by the following preparation examples, working examples and a comparative example.

PREPARATION EXAMPLE 1

Preparation of curing accelerator A

Formulation

EP-1001 (Bisphenol A type epoxy resin, epoxy equivalent 475): 475 g (1 g equivalent)
1-(2-Hydroxy-3-phenoxypropyl)-2-methylimidazole (referred to as "PG-MZ", molecular weight 232): 232 g (1 mol)
Dodecenylsuccinic anhydride (referred to as "DDSA", molecular weight 260): 232 g (1 mol)

Procedure 475 g of EP-1001 was dissolved in 190 g of methyl ethyl ketone (MEK) and then 260 g of DDSA was dissolved therein. The mixture was gradually heated to 60° C. and 232 g of PG-MZ was gradually added thereto to dissolve it. Then, the mixture was heated to 80° C. and then heated at 100° C. for 1 hour after it had lost fluidity, followed by heating under reduced pressure at 120° C. to remove MEK to obtain a light yellow solid. This was ground and used.

PREPARATION EXAMPLE 2

Preparation of curing accelerator B

Formulation

EP-807 (Bisphenol F type epoxy resin, epoxy equivalent 170): 170 g (1 g equivalent)
2-(Dimethylaminomethyl)phenol (referred to as "DMP-10", molecular weight 223): 223 g (1 mol)
Methyltetrahydrophthalic anhydride (referred to as "MTHPA", molecular weight 166): 166 g (1 mol)

Procedure 170 g of EP-807 and 166 g of MTHPA were mixed and stirred and gradually heated. Then, thereto was gradually added 223 g of DMP-10. Thereafter, when viscosity began to increase, the mixture was heated at 80° C. for 30 minutes and then, at 100° C. for 1 hour. Then, it was cooled to room temperature to obtain a reddish brown solid. This was ground and used.

EXAMPLES 1-5 AND COMPARATIVE EXAMPLE

In the following disclosures, "putty" means a balancing material comprising an epoxy resin composition.

Components as shown in the upper column of Table 1 were mixed and the resulting resin compositions were subjected to tests on their properties. The results are shown in the lower column of Table 1.

It can be seen from the results that the epoxy resin compositions of Examples of the present invention were satisfactory in all of pot life, adhesion, heat distortion, strength under heating, deterioration with heat, and applicability to an automatic unbalance-correcting apparatus (such as discharging accuracy, cutting of putty and balance retention accuracy) and were able to be discharged from an automatic discharging machine and had rapid curability and thus, automatic unbalance correction of a rotator was possible.

The properties were measured by the following methods.

(1) Viscosity

Viscosity was measured using a BS type rotational viscometer after five rotations of No. 7 rotor at 2 rpm.

(2) Pot life

About 200 g of an epoxy resin composition was taken in a paper cup and left in a thermostatic chamber of 25° C. Time from the initial viscosity to twice the initial viscosity was taken as the pot life.

(3) Weight reduction rate at curing

About 1 g of epoxy resin composition was taken in an aluminum cup and heated at 200° C. for 10 minutes and change of weight was measured.

(4) Strength under heating

A rotator applied with a resin for correction of unbalance was left at 150° C. for 1 hour and was rotated at 10000 rpm for 1 minute in an atmosphere of 150° C., and change of appearance such as cracking and dry spot of the resin was observed. The strength was evaluated by the following criteria. Outer diameter of the rotator was 50 mm.

"○": No change in appearance
"Δ": Slight change in appearance
"X": Considerable change in appearance (5) Deterioration due to heating A rotator applied with a resin for correction of unbalance was subjected to a voltage of 12-14 V for 1 minute at room temperature and then, was rotated at 10000 rpm for 1 minute, and change of appearance such as cracking and dry spot of the resin was observed. Evaluation was conducted by the following criteria. Outer diameter of the rotator was 50 mm.

"○": No change in appearance
"Δ": Slight change in appearance
"X": Considerable change in appearance (6) Putty discharging accuracy An automatic putty discharging apparatus with a nozzle of 3.4 mm in inner diameter and 50 mm in length was used. Discharging signal was emitted so that 1.0 g of putty was discharged and amount of the actually discharged putty was measured, and scattering of the amount was examined. Discharging temperature was 30° C. The number of samples was 10 and thrice standard deviation was shown.

(7) Balance retention accuracy 1.0 g of putty was dropped onto a given position of a balanced rotator, and immediately thereafter the rotator of 50 mm in outer diameter was rotated at 700 rpm for 1 minute at room temperature without curing the putty. Unbalance amount M at initial stage of rotation and unbalance amount Mn after rotation for 1 minute were measured, and balance retention accuracy was obtained by the following formula.

$$\frac{|\text{Initial value } M - \text{value } Mn \text{ after minute}|}{\text{Initial value } M} \times 100 = \text{Balance retention accuracy (\%)}$$

(Initial value $M = 1$ g)

Average value in sample number n=10 was shown.

A rotator applied with a putty becomes unbalanced, and for balancing this rotator a certain amount of the putty must be applied to the position of the rotator opposite to the position to which the putty has been applied. This amount of the putty is taken as the amount of unbalance. Therefore, the initial value is 1 g. Then, when rotation is carried out, the putty is deformed to cause change of balance. Amount of the putty necessary for balancing after the rotation is Mn.

(8) Adhesion of putty 1.0 g of a putty was dropped onto a rotator and cured by heating at 150° C. for 10 minutes. Thereafter, the rotator was rotated at 10,000 rpm for 1 minute at room temperature, and observation was made on falling off of the putty and adhesion was evaluated by the following criteria. Outer diameter of the rotator was 50 mm.

"○": No falling off occurred.
"Δ": Slight falling off occurred.
"X": Considerable falling off occurred.

(9) Cutting of putty

A putty-discharging apparatus was used. 1.0 g of a putty was discharged from a nozzle of 3.4 mm in inner diameter and 50 mm in length, and after lapse of 1 minute stringing and sagging of the putty from the nozzle were examined. Evaluation was made by the following criteria.

"○": Good
"Δ": Somewhat bad
"X": Bad

(10) Deformation of putty due to heating 1.0 g of a putty was dropped onto a rotator and then, the rotator was heated at 150° C. for 10 minutes to cure the putty. Degree of deformation of the putty after curing as compared with that before curing was examined. Evaluation was made by the following criteria.

"○": Substantially no apparent deformation
"Δ": Some apparent deformation
"X": Considerable apparent deformation

TABLE 1

| | | Condition or unit | Comparative Example | Example 1 | Example 2 | Example 3 | Example 4 | Example 5 |
|---|---|---|---|---|---|---|---|---|
| Composition | Epoxy resin | part | Bisphenol F type① 100 | Bisphenol F type 100 | Bisphenol F type 100 | Bisphenol F type 100 | Bisphenol F type/bisphenol A type② 70/30 | Bisphenol AD type③ 100 |
| | Curing agent | part | Dicyandiamide 6 | Dicyandiamide 6 | Dicyandiamide 6 | Adipic acid dihydrazide 20 | Dicyandiamide 6 | Dicyandiamide 5 |
| | Inorganic filler | part | Alumina 250 | Alumina 250 | Alumina 250 | Alumina 200 | Alumina 250 | Barium sulfate 250 |
| | Average particle size of filler | μm | 15 | 12 | 18 | 12 | 20 | 15 |
| | Thixotropic agent | part | Organic bentonite 8 | Organic bentonite 8 | Organic bentonite 8 | Organic bentonite 6 | Organic bentonite 8 | Organic bentonite 5 |
| | Curing accelerator | part | 2E4MZ④ 5 | Accelerator A 15 | Accelerator B 15 | Accelerator A 10 | Accelerator A 15 | Accelerator A 20 |
| | Total | part | 369 | 379 | 379 | 336 | 379 | 380 |
| Properties | Viscosity | poise/30° C. | 40,000 | 60,000 | 55,000 | 60,000 | 55,000 | 70,000 |
| | Specific gravity | 25° C. | 2.10 | 2.00 | 2.00 | 1.90 | 2.00 | 2.10 |
| | Gelling time | 150° C. | 60 sec | 90 sec | 90 sec | 75 sec | 90 sec | 70 sec |
| | Pot life | 200 g/25° C. | 1 day | 3 months | 3 months | 2 months | 3 months | 3 months |
| | Weight reduction due to curing | % (200° C.) | 1.5 | 0.3 | 0.4 | 0.5 | 0.3 | 0.6 |
| | Thixotropy index | 1 rpm/2 rpm | 1.30 | 1.80 | 1.80 | 1.50 | 1.70 | 1.70 |
| | Sagging | | ○ | ○ | ○ | ○ | ○ | ○ |
| | Strength under heating | | Δ | ○ | ○ | ○ | ○ | ○ |
| | Deterioration due to heating | | Δ | ○ | ○ | ○ | ○ | ○ |
| | Putty discharging accuracy | % | ±5 | ±2 | ±2 | ±2 | ±1 | ±1 |

TABLE 1-continued

|  | Condition or unit | Comparative Example | Example 1 | Example 2 | Example 3 | Example 4 | Example 5 |
|---|---|---|---|---|---|---|---|
| Balance retention accuracy | % | 10 | 3 | 2 | 1 | 2 | 2 |
| Adhesion of putty |  | ◯ | ◯ | ◯ | ◯ | ◯ | ◯ |
| Cutting of puty |  | x | ◯ | ◯ | ◯ | ◯ | ◯ |
| Heat deformation of putty |  | x | ◯ | ◯ | ◯ | ◯ | ◯ |

Notes:
①Bisphenol F type epoxy resin epoxy equivalent: 170
②Bisphenol A type epoxy resin epoxy equivalent: 180
③Bisphenol AD type epoxy resin epoxy equivalent: 175
④2E4MZ = 2-ethyl-4-methyl-imidazole

What is claimed is:

1. In a balanced rotator comprising an unbalanced rotator to which has been added a liquid epoxy resin composition for correcting unbalance of said rotator upon rotation, followed by curing of said liquid epoxy resin, the improvement wherein said liquid epoxy resin composition comprises an epoxy resin, a curing agent, a curing accelerator, an inorganic filler, and an organic thioxtropic agent as main components, wherein said curing agent is dicyandiamide or a dibasic acid dihydrazide and said curing accelerator is a tertiary amino group-containing compound obtained by reacting a polyfunctional epoxy compound, a compound having a tertiary amino group and at least one active hydrogen in the molecule, and a carboxylic acid anhydride.

2. A balanced rotator according to claim 1, wherein the balancing material consists of the epoxy resin composition containing at least one inorganic filler selected from the group consisting of silica, alumina, barium sulfate, and aluminum hydroxide.

3. A balanced rotator according to claim 1, wherein the balancing material consists of the epoxy resin composition containing the inorganic filler in an amount of 150-300 parts by weight per 100 parts of the epoxy resin.

4. A balanced rotator according to claim 1, wherein the balancing material consists of the epoxy resin composition having a specific gravity of 1.8-2.1 at 25° C.

5. A balanced rotator according to claim 1, wherein the balancing material consists of the epoxy resin composition having a thixotropy index of at least 1.4 at 30° C.

6. A balanced rotator according to claim 1, wherein the balancing material consists of the epoxy resin composition containing at least one thixotropic agent selected from the group consisting of organic bentonite and organic composite of colloidal hydrous aluminum silicate.

7. A balanced rotator according to claim 1, wherein the balancing material consists of the epoxy resin composition containing the thixotropic agent in an amount of 5-12 parts by weight per 100 parts by weight of the epoxy resin.

8. A balanced rotator according to claim 1, wherein the balancing material consists of the epoxy resin composition having a viscosity of 10,000-100,000 poises at 30° C.

* * * * *